Aug. 17, 1937.    A. F. SPITZGLASS ET AL    2,090,160
DRAFT AND PRESSURE INDICATOR
Filed Feb. 7, 1934    2 Sheets-Sheet 1

Inventors
Albert F. Spitzglass and
George W. Grisdale
by M. W. McConkey
Attorney Aug. 17, 1937.  A. F. SPITZGLASS ET AL  2,090,160
DRAFT AND PRESSURE INDICATOR
Filed Feb. 7, 1934   2 Sheets-Sheet 2
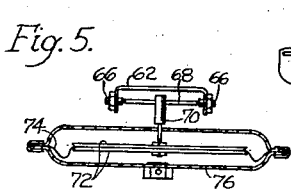
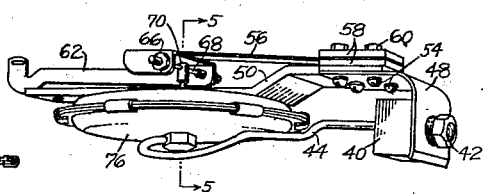
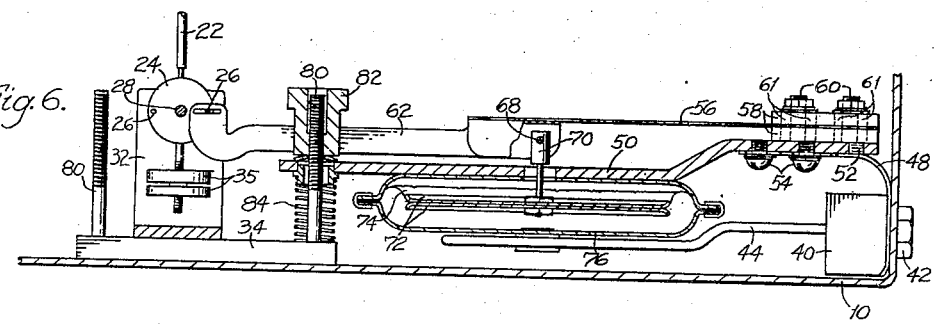
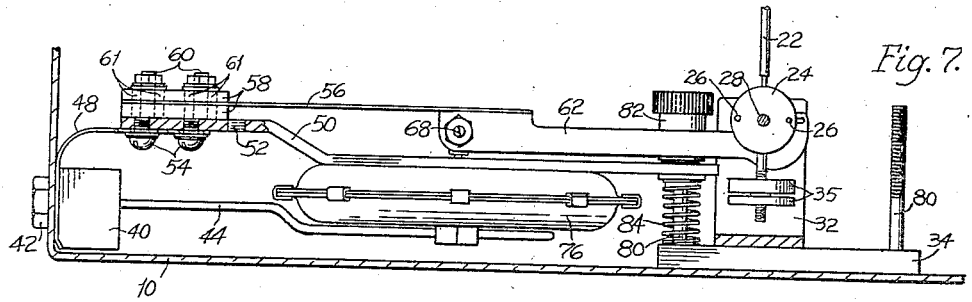
Inventors
Albert F. Spitzglass and
George W. Grisdale
by  Jm. W. McConkey
Attorney Patented Aug. 17, 1937

2,090,160

UNITED STATES PATENT OFFICE 2,090,160

DRAFT AND PRESSURE INDICATOR

Albert F. Spitzglass and George W. Grisdale, Chicago, Ill., assignors to Republic Flow Meters Company, Chicago, Ill., a corporation of Illinois Application February 7, 1934, Serial No. 710,044

17 Claims. (Cl. 73—110)

This invention relates to indicators, and is illustrated as embodied in a multiple indicator for showing simultaneously the pressures or drafts in different parts of a steam power plant or the like, e. g. above and below the grate, in the stack, etc.

One object of the invention is to provide a compact instrument having a series of horizontal scales arranged one above the other, by arranging operating units for the various indicators alternately at opposite sides of the instrument casing. This permits the scales to be of less height than their corresponding operating units, thus greatly reducing the total height of the instrument. The horizontal arrangement of the scales reduces errors of reading due to parallax, and has other advantages.

In order to facilitate the above arrangement, we prefer to construct the operating units so that they may be connected to their respective indicator arms on either side of the axis of the pivot of each arm, so that the operation of an indicator arm by its unit is not affected by the arrangement of the units at one side or the other of the casing.

According to an important feature of the invention, the operating units are self-contained sub-assemblies, readily detachable and replaceable as such (for repair, etc.) without disturbing the indicator arms and other parts of the instrument, and which in themselves embody various features of novelty in construction and arrangement, as pointed out in the detailed description.

We prefer to provide the instrument with a readily-operable adjustment for the zero position of each indicator arm. In the arrangement shown, each of the operating units is provided at the end farthest from the indicator arm with a movable mounting such as a leaf spring, on which is mounted a support carrying all the operating parts. At its other end is arranged means, such as a nut which compresses a spring more or less, for shifting the entire unit consisting of the support with the parts mounted thereon to adjust the zero position of the indicator arm without in any way affecting its operation by the above-described unit.

One structural feature which is important when the operating units include vertically arranged diaphragms, as in the illustrated arrangement, is the provision of means for supporting the weight of the center portion of the diaphragm (together with the weight of the usual metal plates between which the center portion of the diaphragm is embraced), without interfering with its sensitivity of movement. As illustrated, this means comprises a relatively long vertical pivot pin supported at its ends in vertically spaced bearings carried by the lever which operates the indicator arm. By this means the operating lever supports the weight of the diaphragm parts, but does not in any way interfere with its sensitivity of operation.

The above and other objects and features of the invention, including various novel combinations of parts and desirable particular constructions, will be apparent from the following description of the illustrative embodiment shown in the accompanying drawings, in which:

Figure 4 is a perspective view of one of the operating units, detached from the instrument;

Figure 5 is a section through the unit, on the line 5—5 of Figure 4, but with the support omitted;

Figure 6 is a partial section, on the line 6—6 of Figure 2, showing the mounting of one of the units on the right side of the casing;

Figure 7 is a partial section, on the line 7—7 of Figure 2, showing the mounting of one of the units on the left side of the casing; and Figure 8 is a partial perspective showing the mounting of one of the scales.

Figure 1:
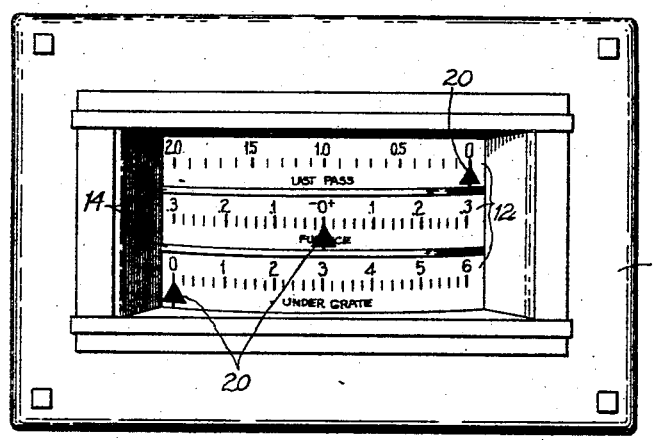
Figure 1 is a front elevation of the instrument provided with three scales.

The instrument, in the form illustrated, comprises a suitable casing 10, at the front of which are arranged a series of curved horizontal scales 12 superimposed one above the other. As shown in Figure 8, each scale 12 is preferably movably supported at its edges throughout its length by channel supports 14 mounted on brackets 16 carried by the casing 10.

The zero end of each scale 12 is preferably fixed by means such as a fastening passing through openings 18 and securing the zero end to one of the brackets 16. The remainder of the scale is movable in the supports 14, so that it will not buckle or change in case of changes in length due to changes in temperature, etc.

Figure 3:
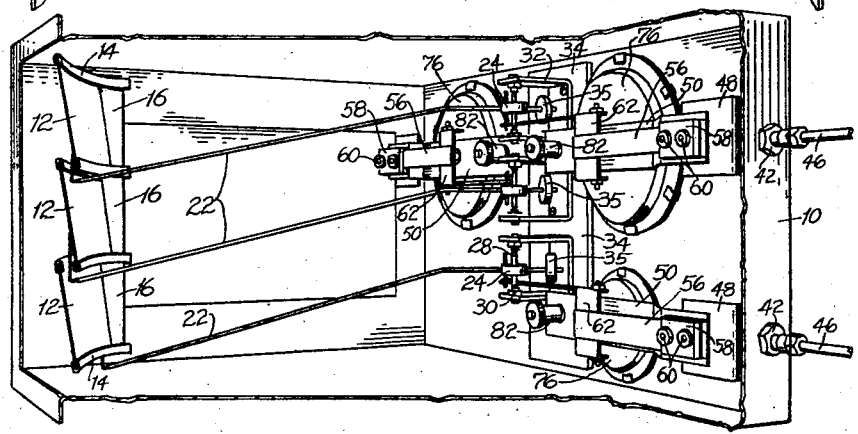
Figure 3 is a perspective of the instrument of Figure 1, broken away to show the interior.

As best shown in Figure 3, the scales are inclined slightly from the vertical, facing slightly downward toward the eye of an observer (the instrument usually being mounted above the observer), with the top edge of each scale in front of, and very slightly above, the bottom edge of the next higher scale, thereby leaving a slot for a pointer 20 carried by the front end of a long and substantially horizontal indicator arm 22.

Each indicator arm 22 has a disk-shaped fulcrum part 24, having at one side a connecting pin 26, or having such pins at both sides, and having at its center a vertical fulcrum pivot pin 28 mounted at its ends in vertically spaced bearings 30 carried by the arms of a U-shaped bracket 32 fastened to a member 34 centrally carried by the rear wall of the casing 10. Thus the member 34 carries all of the indicator arms as a separate sub-assembly, and may be made heavy enough to give them rigid support even if the casing is quite light. Each indicator arm 22 extends rearwardly of its pivot 28, and has adjustably threaded thereon one or more counterweights or balances 35.

The rear wall of the casing may have, if desired, a clip 36 for an electric lamp 38 arranged to illuminate the scales 12, which are preferably of translucent material.

Figure 2:
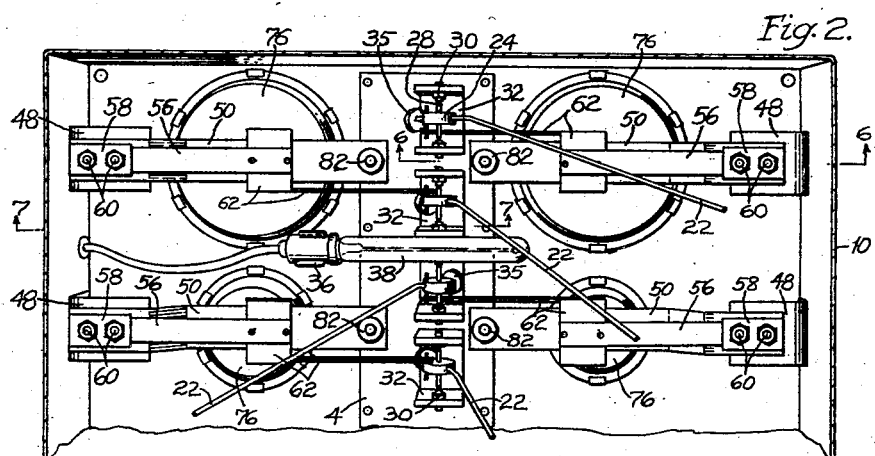
Figure 2 is a vertical section generally at the center of the instrument provided with four scales, showing in front elevation the operating units mounted on the rear face of the instrument casing.

The above-described indicator arms are operated by a series of separate operating units which may be identical in construction, and interchangeable, except for the strength of the springs, and in some cases for the size of the diaphragm. Where the pressures differ too much to be compensated by changing the stiffness of the springs, the size of the diaphragm is selected according to the negative or positive pressure to be measured, and according to the sensitivity desired. Three such units are shown in Figures 1 and 3, and four in Figure 2, while the details of construction are shown in Figures 4 to 7. These units are shown with diaphragms of two sizes, each taking care of a wide range of pressures according to the adjustment of its spring, as explained below.

Owing to the possibility of arranging the units described below alternately on the right and left sides of the common axis of the pivots 28, the scales 12 need only be about half the height of the operating units, thus making for compactness of the entire instrument.

Each of these operating units is carried by a block 40, secured to the side wall of the casing 10 in the corner of the casing, so that the casing prevents its turning, by means such as a nut 42 threaded on a part passing through the casing wall, and which preferably forms a fitting also for the end of a connecting conduit 44 by which it may be connected up as shown in Figure 3 to a conduit 46 leading to the space in which the pressure is being measured.

Secured to the block 40 is a mounting device such as a leaf spring 48 to which is secured a support such as a heavy stamping 50. For reasons explained below, it is desirable to attach the support 50 to the spring support 48 in either of two positions, and to this end it may be formed with three tapped holes 52 for two screws or other fastenings 54, the two positions being shown respectively in Figures 6 and 7.

Each support 50 has mounted thereon, at the end adjacent the block 40, a lever mounting shown as a second leaf spring 56, shown held between two clamp blocks 58 secured by fastenings 60 to the support 50. A lever 62, shown as a formed stamping, is rigidly secured by welding or in any other desired manner to the free end of the leaf spring 56. The end of each operating lever 62 is shown formed with a slot embracing one of the connecting pins 26.

It will be seen that the leaf spring 56, not only serves as a return spring for the lever, but also as a fulcrum upon which the lever pivots to operate the corresponding indicator arm 22.

An intermediate part of the lever 62 has ears carrying vertically spaced bearings 66 (Figure 5) for a relatively long pivot pin 68 centrally attached to the head of a pin or other part 70 projecting through an opening in the support 50 and attached to aluminum plates 72 embracing between them the central portion of a diaphragm 74. The diaphragm 74 is clamped at its edge between two stampings forming a diaphragm casing 76 mounted on the support 50 and with which the conduit 44 connects at the center. Since the top of the casing 76 in Figure 6 has an opening for the passage of part 70, the top of the diaphragm 74 is subject to atmospheric pressure, the bottom being subject to the pressure in the conduit 46.

The weight of the diaphragm and its associated parts, including the plates 72, is carried through pin 70 and pivot pin 68 by the lever 62 and spring 56. This prevents sagging of the diaphragm under the weight of plates 72 without interfering in any way with its freedom of movement or its sensitivity.

The end of the support 50 opposite the support spring 48, i. e. the end adjacent the indicator arm 22, has an opening for a threaded stud 80 carried by member 34. On the end of the stud 80 is threaded an adjusting nut 82 engaging one side of the support 50, and compressing more or less a coil spring 84 sleeved on the stud and engaging the other side of the support 50.

It will be seen that the nut 82 may be manipulated to shift bodily more or less the support 50 and all the parts mounted on it, as a unit without affecting their relative positions and adjustments, thus rocking the indicator arm 22 when there is atmospheric pressure on both sides of the diaphragm 74, to set the corresponding pointer 20 at zero or other predetermined position on the scale. This is therefore the zero adjustment of the instrument, and by placing it close to the connecting pin 26 with the indicator arm 22 the zero adjustment is practically unaffected by deflections of the wall of casing 10 or by other inaccuracies of the mounting of the unit, etc. That is, the stud 80 may be placed close enough to the indicator arm so that the lever arm from the stud to the indicator arm is very short as compared to the lever arm between the stud and the block 40, so that inaccuracies in the position of the block do not substantially affect the indicator arm.

The calibration of the instrument for maximum scale position is made by changing the stiffness of each of the springs 56, for example by loosening the fastenings 60, shifting the blocks 58 lengthwise, as permitted by the slots 61 through which the fastenings pass, to vary the free or effective length of the spring 56 and of course therefore also its stiffness, to give the desired reading at a known pressure. The fastenings 60 are then tightened to preserve the adjustment so made. Of course, springs 56 may be selected in the first place as near as possible the desired stiffness, to minimize the shifting of the blocks 58 necessary in making the described calibration.

By shifting the fastenings 54 in the openings 52 as shown in Figures 6 and 7, the slot in the end of lever 62 may be made to engage its pin 26 either on the same side of the pivot 28 as the lever (Figure 6), or on the opposite side (Figure 7). The end of lever 62 is offset to clear the pivot 28 in the latter case. Which connection is desired depends on (1) whether the operating unit is on the right or left side of the casing, (2) whether the zero of the corresponding scale 12 is at its right or left end, and (3) whether the pressure in the corresponding conduit 46 is above or below atmospheric pressure.

While one illustrative embodiment has been described in detail, it is not our intention to limit the scope of the invention to that particular embodiment or otherwise than by the terms of the appended claims.

We claim:

1. An indicator comprising a pivoted indicator arm, an elongated support adjacent said arm, a pressure operating device mounted on said support, an operating lever operatively connected at one end to the indicator arm and intermediately connected to the operating device and having at its other end a leaf spring secured to the support and serving both as a fulcrum or pivot for the lever and as a return spring therefor, a second leaf spring supporting said support and the parts mounted thereon and arranged at the end of the support opposite the indicator arm, and an adjustable device holding the end of the support adjacent the indicator arm and which is operable to flex the second leaf spring more or less to shift the support together with all the parts mounted thereon, as a unit, to set the zero position of the indicator arm without affecting its operation by the lever.

2. An indicator comprising a pivoted indicator arm, an elongated support movably mounted at the end opposite said arm, an operating device mounted on said support, an operating lever operatively connected at one end to the indicator arm and intermediately connected to the operating device and movably mounted on the support at its other end, and an adjustable device holding the end of the support adjacent the indicator arm opposite the movably mounted end and which is operable to shift the support together with all the parts mounted thereon, as a unit, to set the zero position of the indicator arm without affecting its operation by the lever.

3. An indicator comprising a pivoted indicator arm, an elongated support movably mounted at the end opposite said arm, an operating device mounted on said support, an operating lever operatively connected at one end to the indicator arm and intermediately connected to the operating device and movably mounted on the support at its other end, and an adjustable device holding the end of the support adjacent the indicator arm opposite the movably mounted end and which is operable to shift the support together with all the parts mounted thereon, as a unit, to set the zero position of the indicator arm without affecting its operation by the lever, said device including a threaded stem passing through the support and having an adjustable nut threaded thereon and engaging one side of the support and having a spring sleeved thereon and yieldingly engaging the other side of the support.

4. An indicator comprising a pivoted indicator arm, an elongated support movably mounted at the end opposite said arm, an operating device mounted on said support, an operating lever operatively connected at one end to the indicator arm and intermediately connected to the operating device and movably mounted on the support at its other end, and an adjustable device holding the end of the support adjacent the indicator arm opposite the movably mounted end and which is operable to shift the support together with all the parts mounted thereon, as a unit, to set the zero position of the indicator arm without affecting its operation by the lever, said lever being mountable in two alternative positions to connect it operatively to the indicator arm at one side or the other of the axis of the pivot of the indicator arm.

5. An indicator comprising a pivoted indicator arm, an elongated support adjacent said arm, an operating device mounted on said support, an operating lever operatively connected at one end to the indicator arm and intermediately connected to the operating device and having at its other end a leaf spring secured to the support and serving both as a fulcrum or pivot for the lever and as a return spring therefor, a second leaf spring supporting said support and the parts mounted thereon and arranged at the end of the support opposite the indicator arm, and an adjustable device holding the end of the support adjacent the indicator arm and which is operable to flex the second leaf spring more or less to shift the support together with all the parts mounted thereon, as a unit, to set the zero position of the indicator arm without affecting its operation by the lever, said lever being mountable in two alternative positions on the second leaf spring to connect it operatively to the indicator arm at one side or the other of the axis of the pivot of the indicator arm.

6. An indicator unit comprising a block adapted to be mounted on an instrument casing, a leaf spring mounted on the block, a support mounted on the leaf spring, an operating unit mounted on the support, a second leaf spring mounted on the support, a lever mounted on the second leaf spring, and a connection between the operating unit and the lever.

7. An indicator unit comprising a block adapted to be mounted on an instrument casing, a leaf spring mounted on the block, a support mounted on the leaf spring, a pressure operating unit mounted on the support, a second leaf spring mounted on the support, a lever mounted on the second leaf spring, a connection between the operating unit and the lever, and a conduit communicating at one end with the pressure operating unit and mounted at its other end on said block.

8. An indicating unit intended to be mounted in a vertical plane and comprising a leaf spring secured at one end and having a lever secured at its other end and which lever has a relatively long vertical connecting pin pivotally mounted at its ends thereon, and a vertically mounted diaphragm pressure unit having the center of its diaphragm connected to and supported by the center of said pin.

9. An indicating unit intended for vertical mounting and comprising a vertical diaphragm having center plates secured to its opposite sides by a projecting pin, a vertical pivot pin of considerable length centrally connected to the projecting pin, and an operating lever having vertically-spaced bearings for the ends of the pivot pin and supporting the weight of the parts at the center of the diaphragm without interfering with the sensitivity of action of the diaphragm.

10. An indicating unit intended for vertical mounting and comprising a vertical diaphragm having a weighted center provided with a projecting pin, a vertical pivot pin of considerable length centrally connected to the projecting pin, and an operating lever having vertically-spaced bearings for the ends of the pivot pin and supporting the weight of the parts at the center of the diaphragm without interfering with the sensitivity of action of the diaphragm.

11. In an indicator having an operating device and a lever operated thereby, a support comprising an elongated member mounted at one end for substantially pivotal movement and an adjustable device holding the other end of said member and operable to cause pivotal movement thereof, both the operating device and lever being carried by said member to be moved therewith as a unit.

12. An indicator comprising an elongated support yieldingly mounted at one end for substantially pivotal movement, a device responsive to a condition to be indicated mounted on said support, an operating lever connected at one end to said support and operatively connected to said device to be moved thereby, a pointer operatively connected to said lever, and a device adjustably supporting the other end of said support and adapted to move said support together with all the parts mounted thereon, as a unit, to set said pointer without affecting its operation by the lever.

13. In an indicator, an operating lever mounted at one end and adapted to swing in a substantially horizontal plane, a connecting pin pivoted to said lever by a substantially vertical pivot, and a pressure responsive unit including a casing and a diaphragm secured thereto at its edge in a vertical plane, said pin connected to the center portion of the diaphragm to support the same and to be operated thereby.

14. A pressure indicator unit for multiple pressure indicators of the type having compactly arranged vertically superimposed horizontal scales and vertical pointer shafts pivotally mounted in coaxial relation comprising a pressure responsive element of greater width than one of said scales, a pivoted pointer actuated thereby and movable over one of said scales, the pointer shaft being pivoted at a point laterally of said pressure responsive element, whereby identical pressure responsive elements may be vertically mounted in pairs in complemental relation alternately right and left of the pointer shafts.

15. A pressure indicator unit for multiple pressure indicators of the type having compactly arranged vertically superimposed horizontal scales and vertical pointer shafts pivotally mounted in coaxial relation comprising a pressure responsive element of greater width than one of said scales, a pivoted pointer actuated thereby and movable over one of said scales, the pointer shaft being pivoted at a point laterally of said pressure responsive element, whereby identical pressure responsive elements may be vertically mounted in pairs in complemental relation alternately right and left of the pointer shafts, and two alternative connections between the pressure responsive element and the pointer shaft on opposite sides of the pointer shaft axis, whereby the element may swing the pointer in the same direction regardless of whether it is mounted to the right or to the left of the pointer shaft.

16. A draft gage or the like comprising a bracket, operating means and a lever actuated thereby and which means and lever are mounted on the bracket, indicating means mounted separately from the bracket and operatively connected to said lever, a resilient part supporting one end of the bracket, a coil spring having one end fixed and the other end engaging and yieldingly supporting the other end of the bracket, and a member passing axially through the coil spring and connected to said other end of the bracket and means including said members to shift the bracket against the resistance of the coil spring to correct the zero reading of the indicating means.

17. A draft gage or the like comprising a bracket, operating means and a lever actuated thereby and which means and lever are mounted on the bracket, indicating means mounted separately from the bracket and operatively connected to said lever, a resilient part supporting one end of the bracket, a spring engaging and yieldingly supporting the other end of the bracket, and a member connected to said other end of the bracket and means including said member to shift the bracket against the resistance of the spring to correct the zero reading of the indicating means.

ALBERT F. SPITZGLASS.
GEORGE W. GRISDALE.